Nov. 18, 1924.
I. ROY
ARTICULATED COUPLING DEVICE FOR HEAVY LOADS
Filed May 12, 1922   3 Sheets-Sheet 2
1,515,756
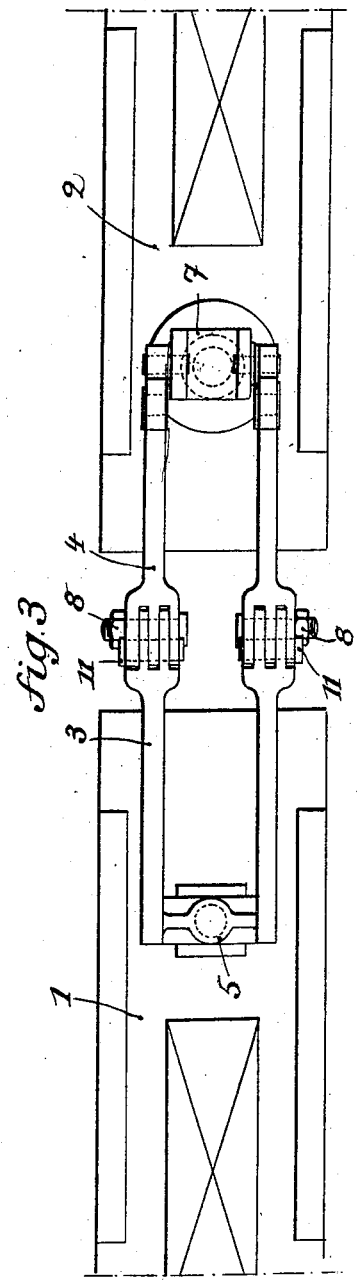
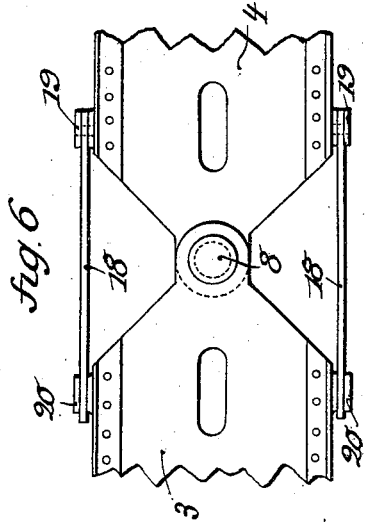
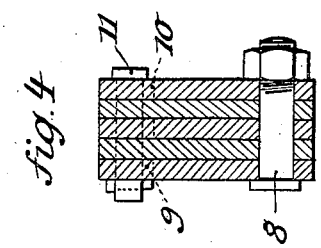
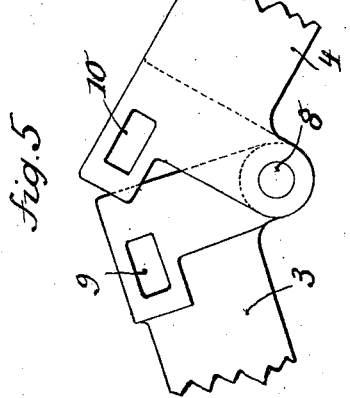
Inventor
I. Roy,
By Marks & Clerk
Attys.

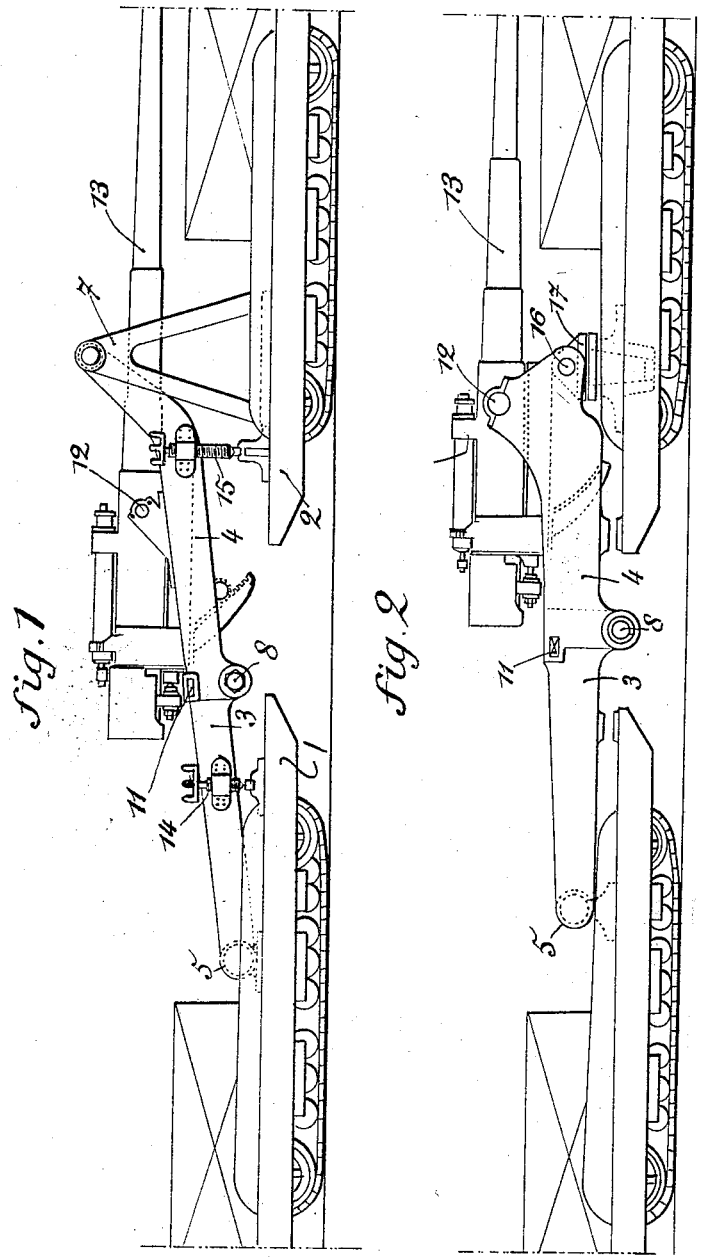

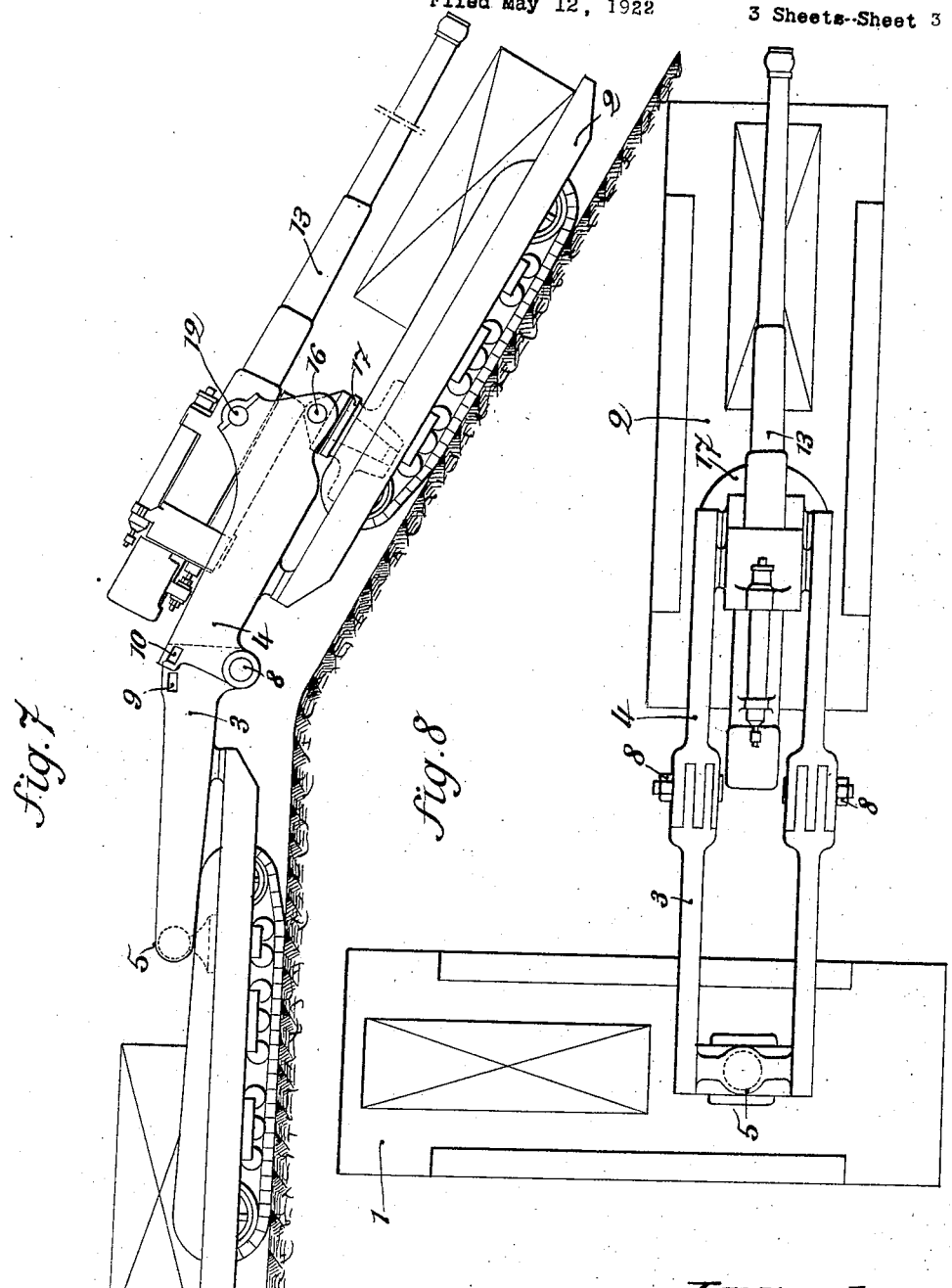

Patented Nov. 18, 1924.

1,515,756

UNITED STATES PATENT OFFICE.

IRÉNÉ ROY, OF PARIS, FRANCE.

ARTICULATED COUPLING DEVICE FOR HEAVY LOADS.

Application filed May 12, 1922. Serial No. 560,455.

*To all whom it may concern:*

Be it known that I, IRÉNÉ ROY, a citizen of the Republic of France, and residing at Paris (Seine Department), in the Republic of France, engineer, have invented certain new and useful Articulated Coupling Devices for Heavy Loads, of which the following is a specification.

The present invention relates to an improvement in a device for coupling tractors in pairs and serves to increase the independence of two vehicles in order to facilitate the passage over obstacles.

To this effect, the beam connecting the two tractors is provided at the middle part with a joint whereby the two platforms of the tractors are enabled to form any angle with each other without inconvenience in the vertical plane.

The following description, together with the accompanying drawings which are given by way of example, sets forth various embodiments of the invention.

Fig. 1 is a side elevation of a form of construction wherein the beam is jointed to the tractors respectively by a ball and socket joint and a horizontal axle.

Fig. 2 shows a similar device having a pivot joint at the front part, and

Fig. 3 is a plan view of the same.

Figs. 4 and 5 represent details of the front part of a joint in section and in elevation, and Fig. 6 is a modified form of the said joint.

Figs. 7 and 8 are respectively elevational and plan views representing various relative positions which may be assumed by the tractors.

In Fig. 1, 1 and 2 are two endless track vehicles having jointed thereto a beam which is composed of two sections 3 and 4. The section 3 is mounted on the vehicle 1 by means of a ball and socket joint 5, whilst the section 4 is mounted by a horizontal axle upon a support 7 disposed upon the vehicle 2.

The two sections 3, 4 are pivoted to an axle 8 and have formed at the upper part, Figs. 4 and 5, the mortises 9, 10 wherein may be disposed a key 11. The portion 4 supports by means of the trunnions 12 a piece of artillery 13. The stop-screws 14 and 15 which are mounted respectively upon the sections 3 and 4 serve to prevent the downward movement of the latter when travelling upon rough ground, while at the same time affording them all the required freedom of movement for the rotation upon the axle 8 and for assuming the position shown in Fig. 7.

For the firing of the piece, the two sections of the beam are rigidly assembled by means of the key 11. By the use of the ball and socket joint 5, the two vehicles can readily assume all desired relative positions, and for example the position shown in Fig. 8.

In Fig. 2 the portion 4 of the beam is jointed by a horizontal axle 16 to a pivot 17 mounted upon the vehicle 2. The stop-screws 14 and 15 are here replaced by fixed stop-pieces.

It is obvious that the joint between the two sections 3 and 4 may be otherwise constructed and may afford displacements in both directions in the vertical plane, for example, it can be disposed as shown in Fig. 6. The axle 8 may be situated midway in the height of the beam, and the bars 18 may be pivoted at 19 and engaged in the connecting pieces 20 in order to provide for the rigidity of this portion.

Claims:

1. In a coupling device for motor tractors adapted for the transport of all loads on all sorts of grounds, and namely of guns or ordnance, a two-part carrying beam connecting these tractors, a horizontal axle carried by one of these tractors to which is articulated one of the said parts or members, a universal joint carried by the other tractor and to which is articulated the other part, and a horizontal axle through which the two parts are articulated together.

2. In a coupling device for motor tractors adapted for the transport of all loads on all sorts of grounds, and namely of guns or ordnance, a two-part carrying beam connecting these tractors, a vertical pin mounted on one of the tractors, a horizontal axle connected with said pin and on which one of the parts is articulated, a universal joint carried by the other tractor and to which the other part is articulated and a horizontal axle by means of which the two parts are articulated together.

3. In a coupling device for motor tractors adapted for the transport of all loads on all sorts of grounds and namely of guns or ordnance, a two-part carrying beam connecting these tractors, a vertical pin mounted on one of the tractors, a horizontal axle connected with said pin and to which one of the parts is articulated, a universal joint carried by the other tractor and to which the other part is articulated, a horizontal axle by means of which the two parts are articulated together, abutments provided on each of the tractors so as to limit the movement of the parts towards the bottom and gears or clutching members allowing to rigidly connect the two parts or members the one with the other.

In testimony that I claim the foregoing as my invention I have signed my name.

IRÉNÉ ROY.